(12) United States Patent
Bon

(10) Patent No.: US 7,218,233 B2
(45) Date of Patent: May 15, 2007

(54) IDENTITY BOOKLET WITH A RADIOFREQUENCY IDENTIFICATION DEVICE

(75) Inventor: Xavier Bon, Les Milles (FR)

(73) Assignee: ASK S.A., Sophia Antipolis (FR)

( * ) Notice: Subject to any disclaimer, the term of this patent is extended or adjusted under 35 U.S.C. 154(b) by 85 days.

(21) Appl. No.: 10/995,210

(22) Filed: Nov. 24, 2004

(65) Prior Publication Data

US 2005/0128085 A1 Jun. 16, 2005

(30) Foreign Application Priority Data

Dec. 2, 2003 (FR) .................................. 03 14144

(51) Int. Cl.
*G08B 13/14* (2006.01)
(52) U.S. Cl. ............................... 340/572.8; 340/572.1; 340/572.7; 340/539.1; 340/568.1; 340/573.1; 340/825.69
(58) Field of Classification Search ............. 340/572.1, 340/572.3, 572.4, 572.7, 572.8, 539.1, 540, 340/541, 568.1, 573.1, 693.5, 693.12, 825.36, 340/825.69
See application file for complete search history.

(56) References Cited

U.S. PATENT DOCUMENTS

| | | | |
|---|---|---|---|
| 4,784,264 A * | 11/1988 | Sykes | 206/387.13 |
| 5,528,222 A | 6/1996 | Moskowitz et al. | 340/572 |
| 6,100,804 A | 8/2000 | Brady et al. | 340/572.7 |
| 6,222,453 B1 * | 4/2001 | Joyce | 340/572.8 |
| 6,655,598 B1 * | 12/2003 | Curiel | 235/487 |
| 7,008,134 B2 * | 3/2006 | Lane | 402/73 |
| 2003/0168514 A1 | 9/2003 | Rancien et al. | 235/492 |

FOREIGN PATENT DOCUMENTS

WO  WO 01/20564  3/2001

* cited by examiner

*Primary Examiner*—Hung Nguyen
(74) *Attorney, Agent, or Firm*—James C. Lydon

(57) ABSTRACT

An identity booklet such as a passport including a reinforced paper cover made up of a top cover board (16) and bottom cover board (14), an inside quire whose top (22) and bottom (20) flyleaves are laminated respectively at the back of the top cover board and in front of the bottom cover board and a radio frequency identification device (RFTD) made up of a chip (12) and an antenna connected to the terminals of the chip. The antenna includes a first part of the antenna (10) placed on the surface of the top and/or bottom cover board designed to be laminated with the corresponding flyleaf and a second part of the antenna placed on the surface of the top and/or bottom flyleaf designed to be laminated with the corresponding cover board, the first and second parts of the antenna being connected to constitute the antenna when the flyleaves are laminated with the cover boards.

5 Claims, 2 Drawing Sheets

IDENTITY BOOKLET WITH A RADIOFREQUENCY IDENTIFICATION DEVICE

TECHNICAL FIELD

This invention concerns the identity booklets such as passports and concerns in particular an identity booklet with a radiofrequency identification device.

BACKGROUND

Contactless Radiofrequency Identification Devices (RFIDs) are increasingly used for identification of persons moving about in controlled access zones or transiting from one zone to another. A contactless RFID is a device made up of an antenna and a chip connected to the terminals of the antenna. The chip is usually not powered and receives its energy by an electromagnetic coupling between the antenna of the reader and the antenna of the RFID, information is exchanged between the RFID and the reader and particularly information stored in the chip that relates to the identification of the holder of the object on which the RFID is located and to his/her authorization to enter into a controlled access zone.

In this manner, passports can incorporate RFIDs to identify the passport holder. The chip memory contains information such as the identity of the passport holder, his/her country of origin, his/her nationality, visas of different countries visited, dates of entry, restrictions of movements, etc. Such a passport is described in the U.S. Pat. No. 5.528.222 and in the patent application WO/00/26856. In these documents, the RFID is incorporated into the passport's top cover board. It is usually inserted between the reinforced cover board and the flyleaf of the quire of passport pages, which is laminated to the back of the reinforced top cover board.

Unfortunately, it is relatively easy for a fraudulent individual to tamper with such a passport and make a forged passport from it. The fraudulent individual simply needs to remove the flyleaf to have access to the RFID and to, either replace the cover by a new cover including another RFID, or merely replace the chip by another chip so that the information supplied by the RFID corresponds to the information contained in the forged passport.

SUMMARY OF THE INVENTION

This is why the purpose of the invention is to provide an identity booklet such as a passport using a radiofrequency identification device in which the antenna is installed in such a way that it gets destroyed if any attempt is made to tamper with the booklet.

The object of the invention is thus an identity booklet, particularly a passport, including a reinforced paper cover made up of a top and bottom cover board, an inner quire whose top and bottom flyleaves are laminated to the back of the top cover board and to the front of the bottom cover board respectively and a radiofrequency identification device (RFID) made up of a chip and an antenna connected to the terminals of the chip, with at least one part of the RFID being inserted between the top cover board and the top flyleaf or between the bottom cover board and the bottom flyleaf. The antenna includes a first part of the antenna placed on the surface of the top and/or bottom cover board designed to be laminated with the corresponding flyleaf and a second part of the antenna placed on the surface of the top and/or bottom flyleaf designed to be laminated with the corresponding cover board, the first and second parts of the antenna being connected to constitute the antenna when the flyleaves are laminated with the cover boards.

BRIEF DESCRIPTION OF THE DRAWINGS

The purposes, objects and characteristics of the invention will become more apparent from the following description when taken in conjunction with the accompanying drawings in which.

DETAILED DESCRIPTION OF THE INVENTION

Figure 1A:
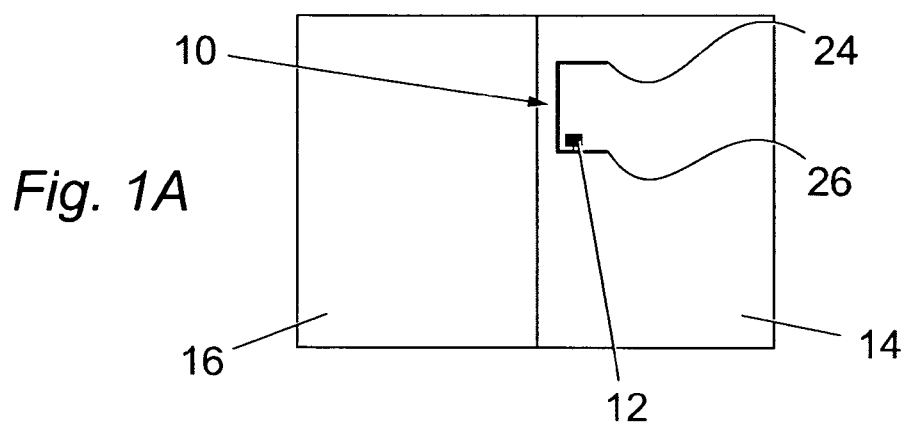
FIG. 1A represents the cover of the booklet according to the invention consisting of the top and bottom cover boards on which is located the first part of the antenna in a first embodiment.

According to a first embodiment of the invention, the first part of the antenna 10 including the chip 12 is at the back of the bottom cover board of the cover 14 of an identity booklet such as a passport illustrated in FIG. 1A. The back of the top cover board 16 does not have an antenna. It should be noted that the first part of the antenna 10 may be a metal strip glued onto the page but it is preferable to secure the antenna by a screen deposit of ink containing metal particles such as silver.

Figure 1B:
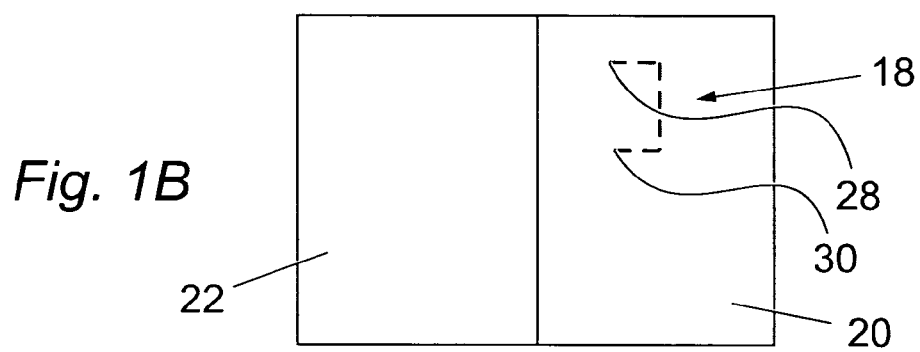
FIG. 1B represents the flyleaves of the booklet on which is located the second part of the antenna according to the first embodiment.

The second part of the antenna 18 illustrated in FIG. 1B is fixed, preferably by screen printing mentioned above, at the back of the bottom flyleaf 20 of the inner quire of pages of the identity booklet (for this reason, it is represented with dotted lines on the figure) when the top flyleaf 22 of the quire does not include an antenna.

Assuming that the booklet is a passport to which the invention preferably relates, the manufacturing method consists in making the inner panes of the quire making up the central pacies of the booklet by using a secure thread to connect them to one another. Then, the flyleaves are laminated on the cover boards, the flyleaf 22 being laminated with the top cover board 16 while the bottom flyleaf 20 is laminated with the bottom cover board 14.

Figure 2:
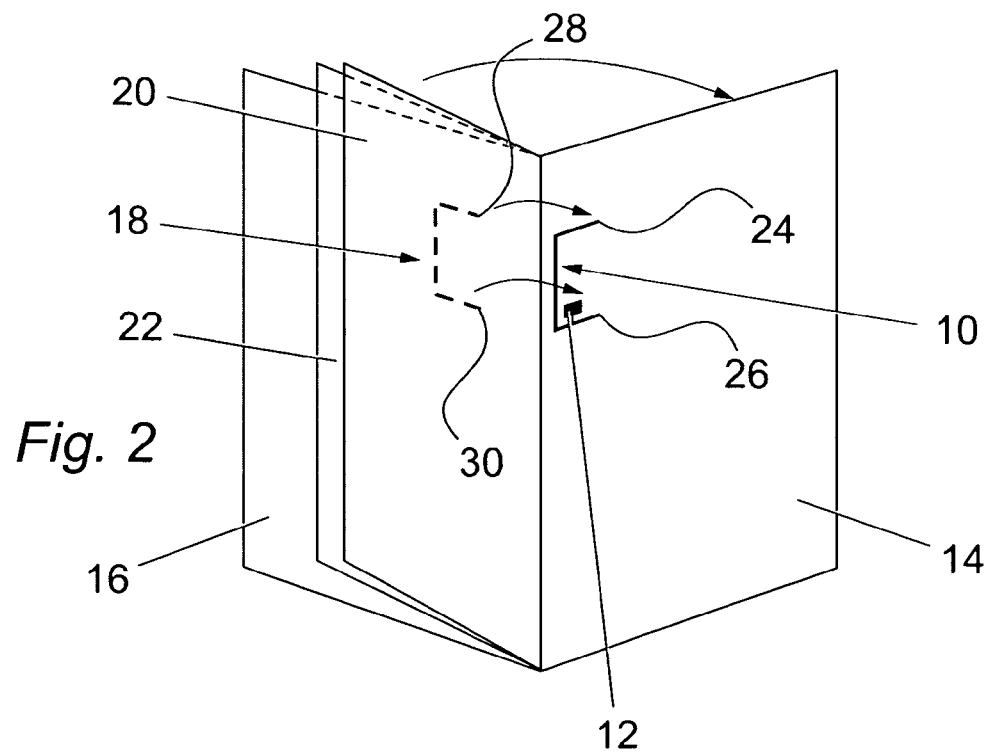
FIG. 2 represents a perspective view of the booklet showing the formation of the antenna of the RFID by juxtaposition at the time of lamination of the first and second parts of the antenna represented in FIGS. 1A and 1B.

As illustrated in FIG. 2, the first part of the antenna 10 and the second part of the antenna 18 were respectively placed on the bottom cover board 14 and the flyleaf 20 in such a way that, at the time of lamination, the end 24 of the first part of the antenna 10 connects to the end 28 of the second part of the antenna 18, and the end 26 of the first part of the antenna connects to the end 30 of the second part of the antenna 18.

The connection between the ends of the first part of the antenna 10 and the ends of the second part of the antenna 18 may be made simply by overlapping two small portions of the antenna located at the ends. Such an overlapping is enough to ensure contact. Even a partial contact or an absence of contact is sufficient so long as the connection is mainly capacitive. It should be noted that the capacitance value is not much involved and in no way disturbs the antenna's tuning frequency (usually 13.56 MHz).

The connection may also be done by placing on both ends of one of the antenna parts, for example the first part, a drop of glue in the form of a knob created with conductive epoxy resin.

By assuming that a fraudulent individual tries to remove the flyleaves in order to forge the passport, he/she will necessarily separate the two parts of the antenna and thereby prohibit any subsequent use of the cover as well as the quire of inside pages, unless he/she deposits the missing part of the antenna by screen printing, which is not easy.

Figure 3A:
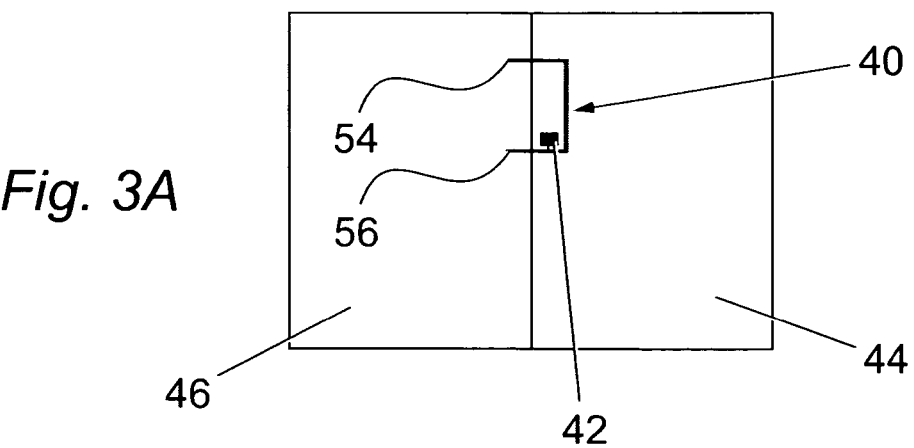
FIG. 3A represents the cover of the booklet according to the invention consisting of the top and bottom cover boards on which is located the first part of the antenna in a second embodiment.
Figure 3B:
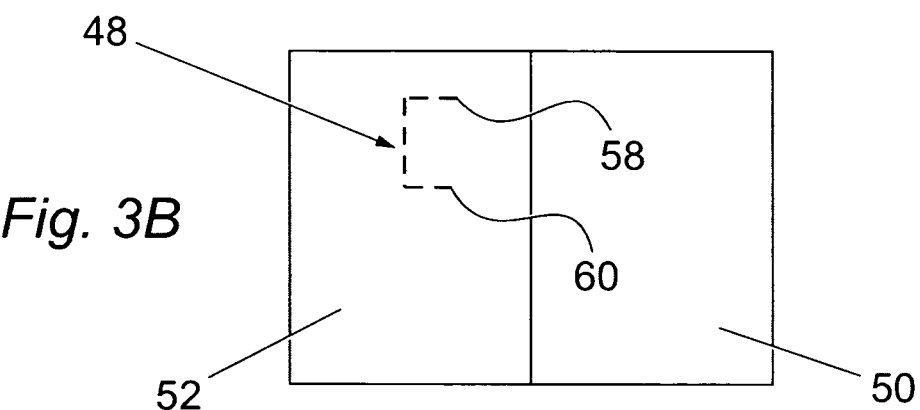
FIG. 3B represents the flyleaves of the booklet on which is located the second part of the antenna according to the second embodiment.
Figure 4:
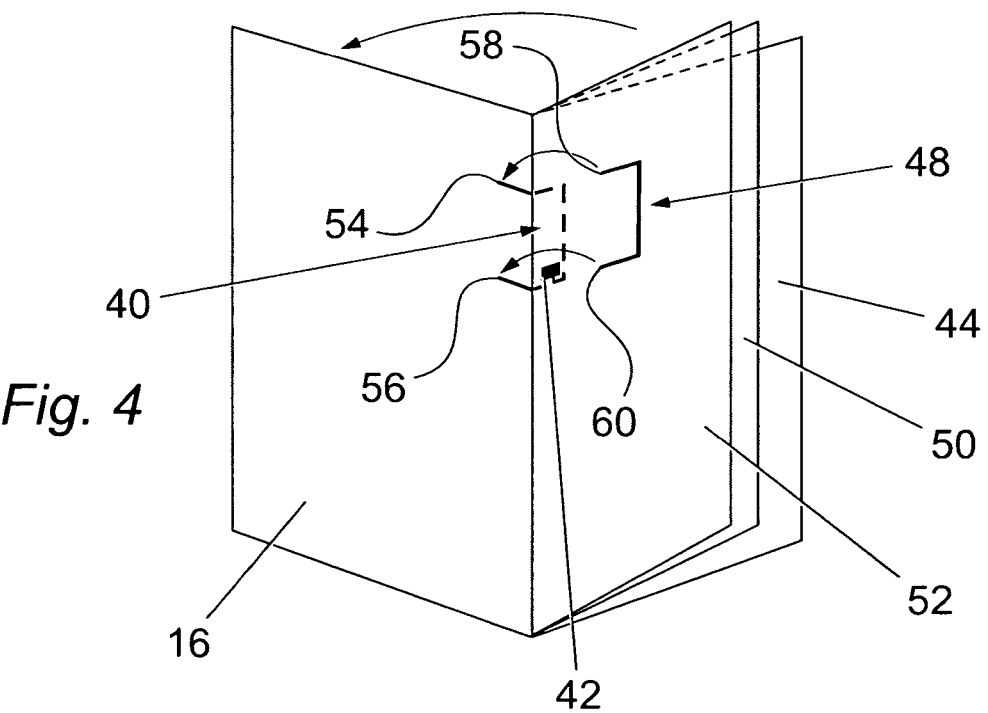
FIG. 4 represents a perspective view of the booklet showing the formation of the antenna of the RFID from the first and second parts of the antenna represented in FIGS. 3A and 3B at the time of lamination.

According to a second embodiment illustrated in FIGS. 3A, 3B and 4, a part of the antenna is placed on the two cover boards and thus overlaps the fold located at the intersection of the two cover boards. Thus, the first part of the antenna 40 comprising the chip 42 includes a portion on the front of the bottom cover board 44 as well as a portion on the back of the top cover board 46.

The second part of the antenna is located entirely in front of the top flyleaf 52 of the passport's quire of pages (it is therefore represented with dotted lines in FIG. 3B) while there is nothing at the back of the bottom flyleaf 50. It should be noted that, as in the previous embodiment, the antenna may be a metal strip but it is preferable that the antenna be made with a screen deposit of conductive ink. The conductive ink used is preferably a polymer ink loaded with conductive elements such as silver, gold, copper and carbon. The material used to screen print the antenna may also be a flexible material such as a conductive polymer. It is also possible to create a flexible joint at the location where the antenna overlaps the fold of the booklet by adding conductive material such as epoxy resin loaded with silver or conductive elements on the antenna at the location of the fold of the booklet in order to make the antenna flexible so that it does not break.

When the flyleaves 50 and 52 are laminated on the cover boards 44 and 46, the end 54 of the first part of the antenna 40 connects to the end 58 of the second part of the antenna 48 and the end 56 of the first part of the antenna 40 connects to the end 60 of the second part of the antenna 48.

As in the previous case, the connection may be made by simple contacts caused by the overlapping between the portions of the two parts of the antenna or by means of a conductive epoxy resin.

The second embodiment presents an essential characteristic that does not exist in the first embodiment. Furthermore, in the first embodiment, the antenna remains planar whether the passport is open or closed, and thus always plays its role as an antenna. In the second embodiment, the antenna is folded up when the passport is closed and thus is not operational in this case. Consequently, the passport may be read only if it is open and presented flat in front of a reader, whereas it cannot be read in the closed position. It may thus never be read without the knowledge of its holder when it is in his/her pocket or bag, which represents an indisputable safety characteristic.

However, according to the first embodiment, assuming that the identity booklet is a passport to which the invention relates, it is advantageous to screen print, on the last page of the quire comprising the passport's central pages, a screen flat against the RFID made up of the two parts of the antenna 10 and 18 and the chip 42 when the passport is closed. This screen is preferably fitted over the entire surface of the page but may be limited to a rectangle whose surface area includes the surface area defined by the two parts of the antenna 10 and 18. The screen is screen printed with conductive ink or a conductive polymer and is either made up of a uniform layer or a grid or check pattern whose width of lines or squares is of the order of a few millimeters and preferably equal to one millimeter. Thus, when the passport is closed, even though the antenna remains planar, no flow can go through it because of the screen that plays the role of a magnetic shield. As the antenna does not play its role as an antenna any more, the chip receives no power and the passport cannot be read by the reader in the closed position.

It goes without saying that the two embodiments that have just been described are not restrictive and that each of the parts of the antenna may be partially or completely placed on the top and/or bottom cover board or on the top and/or bottom flyleaf, the only condition being that both parts of the antenna must be connected when the two flyleaves are laminated with the two cover boards.

The invention claimed is:

1. An identity booklet comprising a reinforced paper cover made up of a top cover board and a bottom cover board, an inner quire comprising a plurality of leaves of paper and whose top and bottom flyleaves are laminated respectively at the back of said top cover board and on the front of said bottom cover board, and a radio frequency identification device (RFTD) made up of a chip and an antenna connected to the terminals of the chip, with at least a part of said RFID being inserted between said top cover board and said top flyleaf or between said bottom cover board and said bottom flyleaf;

wherein said antenna includes a first part of the antenna placed on the surface of said top and/or bottom cover board designed to be laminated with the corresponding flyleaf and a second part of the antenna placed on the surface of said top flyleaf designed to be laminated with said corresponding cover board, said first and second parts of the antenna being connected to constitute said antenna when said flyleaves are laminated with said cover boards, and wherein said first part of the antenna is partly located at the back of said bottom cover board and partly on the front of said top cover board while said second part of the antenna is located completely in front of said top flyleaf, so that said antenna made up by juxtaposition of said antenna parts after lamination of said flyleaves on said cover boards is operational only when said booklet is opened flat in front of a reader, said booklet not being read by said reader when it is closed and said antenna is folded up.

2. The identity booklet of claim 1, wherein the connection between the ends of said first part of the antenna and the ends of said second part of the antenna is made by simple contact due to the overlapping of two small portions of said parts of the antenna at their ends.

3. The identity booklet of claim 1, wherein the connection between the ends of said first part of the antenna and the ends of said second part of the antenna is made by placing conductive glue at the ends of said antenna parts.

4. The identity booklet of claim 1, wherein a flexible joint by adding conductive material such as epoxy resin loaded with silver is placed on the antenna at the location of the fold of the booklet.

5. The identity booklet of claim 1, wherein said first and second parts of the antenna are made by screen printing using conductive ink.

\* \* \* \* \*